RC PHASE SHIFT CIRCUIT HAVING IMPROVED OUTPUT AMPLITUDE STABILITY

Filed Jan. 25, 1968

INVENTORS.
SHOU-LING HOU
PAUL L. WALSH
BY William J. Simmons, Jr.
ATTORNEY

United States Patent Office 3,544,886
Patented Dec. 1, 1970

3,544,886

RC PHASE SHIFT CIRCUIT HAVING IMPROVED OUTPUT AMPLITUDE STABILITY

Shou-Ling Hou, Corning, and Paul L. Walsh, Elmira, N.Y., assignors to Corning Glass Works, Corning, N.Y., a corporation of New York

Filed Jan. 25, 1968, Ser. No. 700,636
Int. Cl. G05f *3/04*
U.S. Cl. 323—75 6 Claims

ABSTRACT OF THE DISCLOSURE

A phase shift circuit for producing a phase shift over a 360° range. Two series RC circuits are connected in parallel and are provided with a low impedance input circuit and a high impedance output circuit to maintain the amplitude of the output signal at an acceptable level. Variable capacitors are utilized to provide a maximum amount of phase shift over a wide frequency range.

BACKGROUND OF THE INVENTION

This invention relates to an RC phase shift circuit which can produce a phase shift over a 360° range with no change in magnitude of the output signal. The phase shifter of this invention is effective over a wide range of frequencies.

Various phase shifters are known which are capable of shifting the phase of an input signal from 0 through 360°. One such phase shifter utilizes crossed field coils and a rotating pick up coil. Another such phase shifter utilizes an induction motor. Still others employ variable capacitors having specially shaped rotors and stators. These prior art phase shifters are relatively expensive and cumbersome.

Perhaps the simplest phase shifter consists of a series RC circuit from which a phase shift from 0° to 90° is obtainable by varying the resistance from zero to infinity. Besides the obvious limitation in the amount of phase shift obtainable by this simple RC circuit, the magnitude of the output voltage changes with a change in the phase shift produced thereby.

SUMMARY OF THE INVENTION

It is therefore an object of the present invention to provide an RC phase shift circuit which is capable of changing the phase of an input signal over approximately a 360° range with no change in the magnitude of the output voltage.

Another object of the present invention is to provide a phase shift circuit which is of a simpler construction than presently available phase shifters which are capable of providing a continuously variable phase shift over a 360° range.

Basically, the phase shift circuit according to this invention comprises first, second, third and fourth terminals, a first variable resistor connected between the second and third terminals, a second variable resistor connected between the first and fourth terminals, first capacitor means connected between the first and third terminals and second capacitor means connected between the second and fourth terminals. Means are provided for simultaneously varying the resistance of the first and second variable resistors so that the resistances thereof are substantially equal. Input coupling means are provided for connecting across the first and second terminals a source of signals, the phase of which is to be shifted, the input coupling means effectively reducing the impedance of the source of signals which is to be connected thereto. Furthermore, output coupling means is provided for connecting the third and fourth terminals to a utilization device, the output coupling means presenting a high impedance to the third and fourth terminals.

Additional objects, features, and advantages of the present invention will become apparent to those skilled in the art, from the following detailed description and the attached drawing on which, by way of example, only the preferred embodiment of this invention is illustrated.

DETAILED DESCRIPTION

Figures 1, 2:
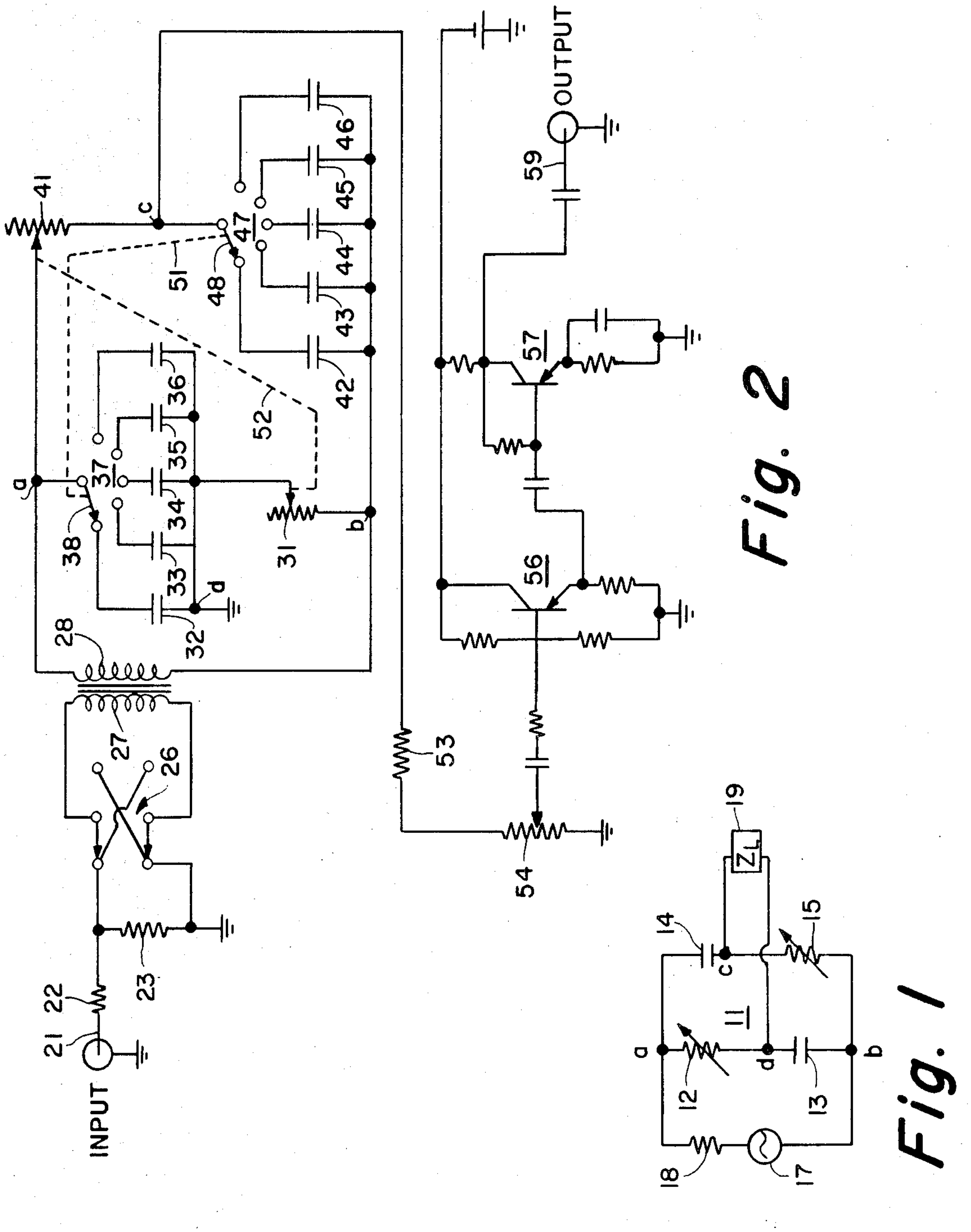
FIG. 1 is a schematic diagram of a simplified form of the present invention.
FIG. 2 is a schematic diagram of the preferred embodiment of the present invention.

FIG. 1 shows a schematic diagram of a simplified version of a phase shift network of the type to which the present invention relates. The network 11 consists of the parallel combination of two series RC circuits. One of the series circuits consists of a variable resistor 12 and a capacitor 13, the other consisting of a capacitor 14 and a variable resistor 15. An input signal source 17 having an internal impedance 18 is connected across the input terminals *a* and *b* of the network 11. A load impedance 19 is connected across the output terminals *c* and *d* of the network 11.

It is well known that by varying the resistance in a series RC network it is theoretically possible to obtain a phase shift over a 90° range. Referring to FIG. 1, such a phase shift circuit could consist of the resistor 12 in series with the capacitor 13. In such a single series RC circuit the input signal would be applied across terminals *a* and *b* while the output would be taken across the terminals *b* and *d*. The signal applied to the terminals *a* and *b* could be shifted in phase over a 90° range by varying the resistance of the resistor 12 from zero to infinity. However as the resistance increases and the phase shift increases toward 90°, the amplitude of the output signal decreases.

It is possible to obtain a phase shift over a range of approrimately 180° by adding a second series RC circuit consisting of the resistor 15 and the capacitor 14 in parallel with the first mentioned RC circuit. This parallel combination, in which the output signal is taken from the terminals *c* and *d*, permits a phase shift over approximately a 180° range. However, if the magnitude of the output voltage is to be maintained at an acceptable level, the input impedance 18 must be much less than the maximum resistance of each of the resistors 12 and 15 while the magnitude of the output impedance 19 must be much larger than the maximum attainable resistance of each of the resistors 12 and 15.

The circuit of FIG. 2 is so constructed as to provide a 360° range of phase shift while maintaining the magnitude of the output voltage. The terminals in FIG. 2 which correspond to terminals *a*, *b*, *c* and *d* of FIG. 1 are designated by the same reference letters. The input signal voltage, which appears on a lead 21, is impressed across a voltage divider consisting of resistors 22 and 23, the resistance of the resistor 23 being much smaller than that of the resistor 22. The primary winding 27 of a step down transformer is connected across the resistor 23 by a double pole double throw switch 26. The secondary winding 28 is connected across the terminals *a* and *b* of a phase shift network consisting of the parallel combination of two series RC circuits. The first of these circuits consists of a potentiometer 31, one end terminal of which is connected to the terminal *b*, the wiper arm thereof being connected to a plurality of capacitors 32 through 36. The remaining terminals of the capacitors 32 through 36 are connected to the stationary contacts of a switch 37, the movable contact 38 being connected to the terminal *a*. The second series RC circuit consists of a potentiometer 41, one terminal of which is connected to the movable contact 48 of a switch 47, the wiper arm of the potentiometer 41 being connected to the terminal *a*. The stationary contacts of the switch 47 are connected to a plurality of capacitors 42 through 46, the capacitances of which are equal to those of the capacitors 32 through 36, respectively. The remaining terminals of capacitors 42 through 46 are connected to the terminal *b*. As indicated by the dashed line 51, the switches 38 and 48 are ganged so that equal valued capacitors are simultaneously inserted into each RC circuit. A dashed line 52 indicates that the potentiometers 31 and 41 are ganged so that the resistances thereof are always equal.

The output signal from the phase shift network is taken from the terminal *c*, the terminal *d* being connected to a source of reference potential. The terminal *c* is connected to the base of an emitter follower transistor 56 by a high resistance resistor 53 and a potentiometer 54, the potentiometer providing gain control. The emitter of the transistor 56 is connected to a transistor amplifier 57, the collector of which is connected to an output terminal 59. The coupling networks and the biasing networks of the transistors 56 and 57 are conventional and have therefore not been described. These transistors are biased for class A operation for minimum distortion.

The various conditions necessary for a constant amplitude output voltage over a 360° range of phase shift have been met by the hereinabove described circuit. The input signal is taken from a relatively low resistance resistor 23 and coupled by a step down transformer to the RC phase shift network. The impedance of the resistor 23 is effectively reduced by the square of the turns ratio of the transformer. The output impedance is maintained at a high level by the resistor 53 and the input impedance of the emitter follower transistor 56. The input impedance is therefore maintained at a value which is much less than the maximum resistance of the potentiometers 31 and 41 while the output impedance is maintained at a value which is much greater than the maximum resistance of these potentiometers.

In order to achieve the maximum range of phase shift by varying the potentiometers 31 and 41 from zero resistance to their maximum value, the capacitive reactance of the capacitor which is in series with the potentiometer must be approximately equal to the resistance of the resistor. Thus, if input signals having different frequencies are to be applied to the input terminal 21, means must be made available for changing the capacitance in each of the two RC circuits so that the capacitive reactance is about equal to the maximum potentiometer resistance. This is accomplished by providing each series RC circuit with a plurality of capacitors, any one of which can be switched into series with its associated potentiometer. The switch 26 increases the amount of phase shift to twice that which would be available from the RC phase shift network alone.

In one specific embodiment the maximum resistance of the potentiometers 31 and 41 was 10KΩ. The capacitance of capacitors 32 to 36 varied from 10 microfarads down to 0.001 microfarad in steps of 10. The capacitance of capacitors 42 to 46 was equal to that of capacitors 32 to 36, respectively. By selecting the proper value of capacitance by the proper positioning of the switches 37 and 47, this circuit could shift the phase of input signals having a frequency between 40 Hz. and 60 kHz. over approximately a 180° range. By properly positioning the switch 26, a phase shift between approximately −180° and +180° was obtained.

We claim:

1. A phase shift circuit comprising:
first and second terminals,
the series combination of a first variable capacitor and a first variable resistor connected between said first and second terminals, said first capacitor being connected to said first terminal, the junction between said first capacitor and said first variable resistor constituting a third terminal,
the series combination of a second variable capacitor and a second variable resistor connected between said first and second terminals, said second capacitor being connected to said second terminal, the junction between said second capacitor and said second variable resistor constituting a fourth terminal,
means for simultaneously varying the resistance of said first and second variable resistors so that the resistances thereof are substantially equal,
means for simultaneously varying said capacitors so that the capacitances thereof are substantially equal, and so that the reactances thereof are approximately equal to the maximum resistance of said variable resistors at the signal frequency,
a transformer having primary and secondary windings, said secondary winding being connected across said first and second terminals, said transformer effectively reducing the impedance of the source of signals applied to the primary winding thereof,
a double pole, double throw switch, said primary winding being connected to said switch, and
output coupling means for connecting said third and fourth terminals to a utilization device, said output coupling means presenting a high impedance to said third and fourth terminals.

2. A phase shift circuit in accordance with claim 1 wherein said output coupling means comprises an emitter follower amplifier having input and output terminals, and a high resistance coupling resistor connecting said fourth terminal to said emitter follower input terminal.

3. A phase shift circuit in accordance with claim 2 which further includes gain control means interposed between said coupling resistor and said emitter follower input terminal.

4. A phase shift circuit comprising:
first, second, third and fourth terminals,
a transformer having primary and secondary windings, said secondary winding being connected across said first and second terminals said transformer effectively reducing the impedance of the source of signals which is to be connected thereto,
a double pole, double throw switch connected to said primary winding,
a first variable resistor connected between said second and third terminals,
a second variable resistor connected between said first and fourth terminals,
means for simultaneously varying the resistance of said first and second variable resistors so that the resistances thereof are substantially equal,
first capacitor means connected between said first and third terminals, said first capacitor means being variable in discrete steps,
second capacitor means connected between said second and fourth terminals, said second capacitor means being variable in the same discrete steps as said first capacitor means,
means for simultaneously varying said first and second capacitor means so that the capacitances thereof are substantially equal, and so that the reactances thereof are approximately equal to the maximum resistance of said variable resistors at the signal frequency,
an output terminal, and
an amplifier having a high impedance input electrode and an output electrode, said amplifier electrode being connected to said fourth terminal and said amplifier output electrode being connected to said output terminal.

5. A phase shift circuit in accordance with claim 4 wherein said first and second capacitor means comprise a plurality of capacitors and a switch connected to said plurality of capacitors for selecting any one thereof.

6. A phase shift circuit comprising:

first and second terminals, the series combination of first capacitor means and a first variable resistor connected between said first and second terminals, said first capacitor means being connected to said first terminal, the junction between said first capacitor means and said first variable resistor constituting a third terminal, the series combination of second capacitor means and a second variable resistor connected between said first and second terminals, said second capacitor means being connected to said second terminal, the junction between said second capacitor means and said second variable resistor constituting a fourth terminal, means for simultaneously varying the resistance of said first and second variable resistors so that the resistances thereof are substantially equal, a pair of input terminals, first and second input resistors connected in series across said input terminals, the resistance of said second input resistor being smaller than that of said first input resistor, a double pole, double throw switch having a pair of input terminals and a pair of output terminals, said pair of input terminals being connected to opposite ends of said second input resistor, a step down transformer having primary and secondary windings, said primary winding being connected to said pair of output terminals of said double pole, double throw switch, and said secondary winding being connected across said first and second terminals, and output coupling means for connecting said third and fourth terminals to a utilization device, said output coupling means presenting a high impedance to said third and fourth terminals.

References Cited

UNITED STATES PATENTS

| | | | |
|---|---|---|---|
| 1,926,877 | 9/1933 | Marrison | 333—29 |
| 2,595,626 | 5/1952 | Bailey | 323—75(K) |
| 2,648,773 | 8/1953 | Wallace, Jr. | 323—75(K) |
| 3,127,577 | 3/1964 | La Pointe | 333—29 |
| 3,287,628 | 11/1966 | Keiper, Jr. | 323—123 |

J D MILLER, Primary Examiner

G. GOLDBERG, Assistant Examiner

U.S. Cl. X.R.

323—123; 333—29